Dec. 16, 1930.  J. F. WILLIAMS  1,785,063
ANTIFRICTION BEARING
Filed Aug. 7, 1928

INVENTOR:
JAMES F. WILLIAMS,
BY
Gales P. Moore
HIS ATTORNEY.

Patented Dec. 16, 1930

1,785,063

UNITED STATES PATENT OFFICE

JAMES F. WILLIAMS, OF LYNDHURST, NEW JERSEY, ASSIGNOR TO GENERAL MOTORS CORPORATION, OF DETROIT, MICHIGAN, A CORPORATION OF DELAWARE

ANTIFRICTION BEARING

Application filed August 7, 1928. Serial No. 297,965.

This invention relates to antifriction bearings and comprises all the features of novelty herein disclosed, by way of example, in connection with a roller bearing. An object of the invention is to provide an improved retaining device to hold rolling elements. Another object is to simplify the bearing and retaining means and reduce the cost of manufacture.

To these ends and to improve generally and in detail upon devices of this character, the invention also consists in the various matters hereinafter disclosed.

In the drawings, Fig. 1 is a central cross section of the assembled bearing.

Figure 1:
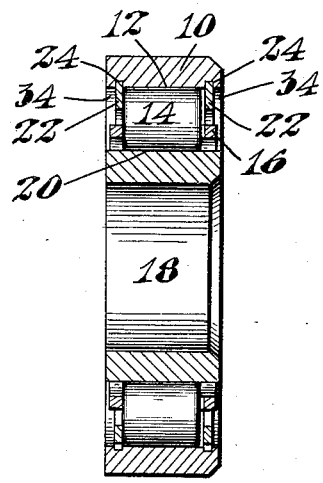
Figure 2:
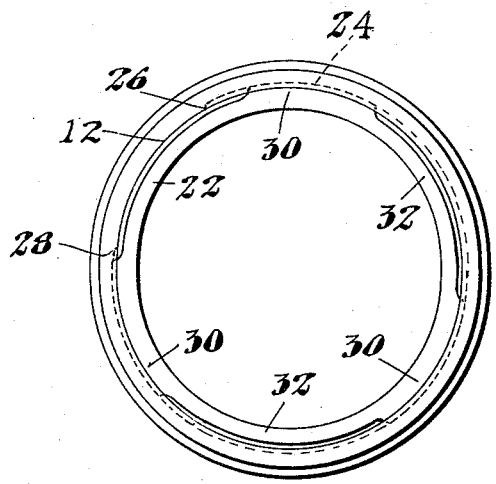
Figure 2 is a side elevation.
Figure 3:
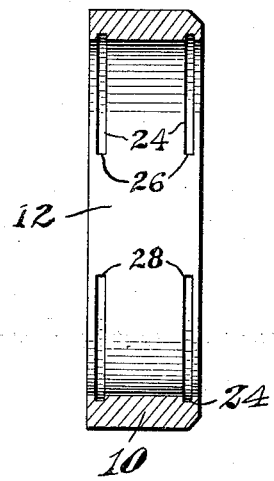
Figure 3 is a section of one of the race rings.

The numeral 10 indicates an outer race ring having a cylindrical raceway 12 for a circular series of short cylindrical rollers 14 spaced by a band 16 which has openings smaller than the rollers and arranged inside the axes of the rollers to hold them outwardly towards the outer race ring. A removable inner race ring 18 having a cylindrical raceway 20 is arranged inside the circle of rollers.

Figure 4:
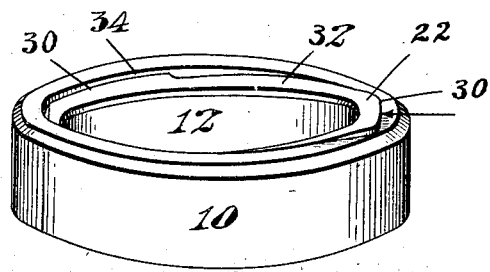
Figure 4 is a perspective view and Figure 5 is a transverse section indicating the method of assembling the retaining devices.
Figure 5:
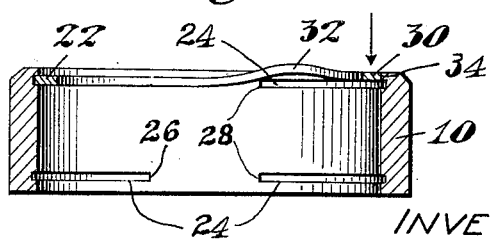

In order to hold the rollers against endwise movement and guide them, a pair of retaining rings 22 are secured in arcuate grooves 24 of one of the race rings. Each groove is milled in an arc of less than 360° and breaks out into the raceway 12 at the points 26 and 28. Each ring is provided with a series of radial projections or tongues 30, preferably three, two of these being spaced apart to straddle the uncut portion of the raceway between the points 26 and 28 thus holding the rings from rotation as the rollers rub against them. These two tongues are wholly on one side of a diameter of the ring and the remaining tongue is on the other side of the diameter and spaced from the others by easily deformable portions 32. The rings are applied as indicated in Figs. 4 and 5. With two of the tongues in the arcuate groove, a radial pressure is applied in the direction of the arrow in Fig. 4 against the remaining tongue thereby causing the ring to buckle a little at its weaker portions 32. Then an axial pressure will cause this remaining tongue to be carried past the land 34 whereupon it snaps into the groove. Assembly is purely by elastic deformation so that the rings regain their original flat shape and so preserve a continuous and uniform guiding surface over which wear of the rollers is evenly distributed. The depth of each groove 24 is such that the arcuate ends of the tongues will just fit within it while the weaker portions 32 of the ring having a clearance with the lands 34. The arcuate grooves can be milled quicker than circular grooves can be turned and the ends of the grooves are engaged by the tongues to prevent rotation of the retaining rings. The tongues engage the opposite side walls of the grooves thus also preventing the rings from moving axially with respect to the race ring while the rings are elsewhere clear of the grooves.

I claim:

1. In an antifriction bearing, a race ring having a raceway and an arcuate groove at the end of the raceway, the groove being peripherally discontinuous and its ends breaking out into the raceway, and a guiding and retaining element held in the groove and comprising a flat sided ring having a pair of tongues spaced apart to straddle the material of the race ring between the ends of the arcuate groove; substantially as described.

2. In an antifriction bearing, a race ring having a raceway with an arcuate groove cut around the greater portion of its periphery leaving a shorter uncut portion intervening between the ends of the groove, and a ring having radial tongues insertable in the groove, the ring being held from rotation by engagement of one of the tongues with the end of the groove; substantially as described.

3. In an antifriction bearing, a race ring having a cylindrical raceway and an arcuate groove at the end of the raceway, the groove being peripherally discontinuous and its ends breaking out into the raceway, a flat sided retaining ring having a pair of radially projecting tongues insertable in the groove and straddling the material of the race ring between the ends of the groove, and a single tongue projecting from the ring at the side opposite the ungrooved portion of the race ring; substantially as described.

4. In an antifriction bearing, a race ring having a raceway and an arcuate groove at the end of the raceway, the groove being peripherally discontinuous and its ends breaking out into the raceway, and a guiding and retaining element held in the groove and comprising a flat sided ring having a pair of projecting tongues located wholly on one side of a diameter of the ring and spaced apart to straddle the material of the race ring between the ends of the arcuate groove, and a single tongue projecting radially from the ring on the other side of the diameter opposite the space between the first two tongues, said single tongue being widely spaced from the first two tongues by easily deformable arcuate portions; substantially as described.

5. In an antifriction bearing, a race ring having a raceway with an arcuate groove of uniform width extending around the greater portion of the circumference, the ring having a portion forming an interruption to the continuity of said groove, and a ring having radial tongues insertable in the groove, the ring being held from rotation by engagement of one of the tongues with said interruption, and the tongues fitting between the opposite side walls of the groove to hold the ring from axial movement, the remainder of the ring being clear of the grooves; substantially as described.

In testimony whereof I hereunto affix my signature.

JAMES F. WILLIAMS.